United States Patent [19]

Lysen

[11] Patent Number: 4,964,301
[45] Date of Patent: Oct. 23, 1990

[54] CHIP LEVEL INDICATOR WITH DIFFERENTIAL TRANSFORMER

[75] Inventor: Claes G. Lysen, Karlstad, Sweden

[73] Assignee: Kamyr AB, Karlstad, Sweden

[21] Appl. No.: 342,932

[22] Filed: Apr. 25, 1989

[51] Int. Cl.⁵ ............................................. G01F 23/28
[52] U.S. Cl. ............................. 73/290 R; 324/207.17
[58] Field of Search .................. 73/290 R, DIG. 5; 340/612, 615; 324/209, 208

[56] References Cited

U.S. PATENT DOCUMENTS

| 2,700,758 | 1/1955 | Smith | 324/208 |
| 3,100,390 | 8/1963 | Banks | 73/290 V |
| 3,282,084 | 11/1966 | Banks | 73/290 V |

FOREIGN PATENT DOCUMENTS

| 848982 | 7/1981 | U.S.S.R. | 324/208 |
| 1032931 | 6/1966 | United Kingdom | 324/208 |

Primary Examiner—William A. Cuchlinski, Jr.
Assistant Examiner—W. Morris Worth
Attorney, Agent, or Firm—Nixon & Vanderhye

[57] ABSTRACT

A solids level detecting assembly is particularly useful for detecting the level of paper pulp (or wood chips during the manufacture of pulp) in a vertical vessel. A first hollow shaft is affixed at a portion thereof to a vessel with a first end extending into the vessel. A second shaft, concentric with the first, is disposed within it and connected at a first end thereof to the first end of the hollow shaft, and to a paddle (plate). A sensing device, including a movable core element of high magnetic permeability material, is mounted to a free end of the second shaft. A stationary core element is mounted adjacent the movable element so that a twisting motion of the first shaft as a result of solid particles acting on the plate changes the flux in the core elements. A flux detector (comprising a pair of coils and a voltage detector) detects the changes in magnetic flux in the core elements, and indicates the change on an indicator, which thus illustrates the level of pulp or chips within the vessel.

18 Claims, 2 Drawing Sheets

CHIP LEVEL INDICATOR WITH DIFFERENTIAL TRANSFORMER

BACKGROUND AND SUMMARY OF THE INVENTION

There are many situations in which the level of solid particles within a vessel (including bins or pipes) is desirably determined. In the pulp and paper production field there are many situations where the level of pulp, or wood chips during the production of pulp, need be accurately determined, such as in continuous wood chip digesters for the production of chemical paper pulp.

One useful prior art device for determining the level of solids within a vessel is shown in U.S. Pat. No. 3,971,254, the disclosure of which is hereby incorporated by reference herein. In that device, the torsional movement of a shaft disposed within the vessel and connected to a paddle (plate extending perpendicular to the flow of solids) is sensed utilizing strain gauges mounted on a thin walled portion of the shaft, interiorly of the shaft. Shear pins are provided connecting the shaft and the housing for the shaft so that they are the weakest portion of the assembly, breaking before the paddle or shaft will break. While the device illustrated in that patent is very useful and successful, it has some drawbacks associated with it. Typically the strain gauges are glued to the inside of the thin walled portion of the shaft. Gluing of the sensors is precision work for a skilled worker, not something that can be handled by the average maintenance technician. Also, the glue curing procedure requires control of the temperature and makes it difficult to replace a strain gauge without interrupting the operation of the vessel (e.g. digester) with which the level sensor is associated. Also, in the cooking zone of a digester or the like, it is often necessary to provide cooling water between the shaft and the housing for cooling the strain gauges to keep them operating properly.

According to the present invention, a level detector or the like, and a method of detecting solids within a vessel, are provided which overcome the above-mentioned problems. The invention utilizes components that may be mounted entirely exteriorly of the vessel so that they are readily accessed for replacement or repair. Preferably a differential transformer is provided, and is mounted by bolts directly on the outside of the vessel, so that it may be readily removed, replaced, or repaired. Also, no cooling water is necessary since the coils of the differential transformer can withstand at least 180° C, and no glue is necessary for mounting. Further, the shear pins provided in the U.S. Pat. No. 3,971,254 indicator can be eliminated, as can a pressure seal that allows rotation of the shaft in the prior art device. This is so since the shaft whose torsional movement will be sensed can be made of greater diameter and wall thickness, while still sensing the twisting force thereon with great enough sensitivity to indicate the presence or absence of solids at that particular point within the vessel.

According to a first aspect of the present invention a detector is provided for detecting the solids position in a vessel which is adapted to have solid particles moving therein along an axis thereof. The detector comprises: A first hollow shaft having a shaft axis passing through the center thereof. A second shaft, generally concentric with the first shaft, and extending along the shaft axis and having first and second ends. Means for operatively fixing the first shaft at a first portion thereof to the vessel, with a first end remote from the first portion and extending into the vessel. Means for operatively connecting the second shaft first end to the first end of the first shaft, the second end of the second shaft being free. A plate operatively connected to the first shaft first end and the second shaft first end, so that it is generally perpendicular to the axis of the vessel. And, sensing means, including a movable element mounted to the second shaft second end, and a stationary element adjacent the movable element, for sensing twisting motion of the first shaft as a result of solid particles acting on the plate. The sensing means preferably comprises a differential transformer; i.e. a movable core element made of high magnetic permeability material, and a stationary core element also of such material. A plurality of coils are operatively associated with the core elements, and alternating current is provided to at least one of the coils. A voltage detector detects changes in voltage due to variations in the magnetic flux in the core elements, and an indicator is operatively connected to the detector. The indicator thus indicates the presence or absence of solids acting on the plate.

The invention also relates to a solids level detecting assembly which comprises a vessel adapted to have solid particles moving downwardly therein, having a generally vertical axis; means for responsive to the level of solid particles in the vessel, including the plate; and means for mounting the level responsive means in the vessel so that the plate is within the vessel and is disposed generally horizontally. The means responsive to the level of the solid particles preferably includes a movable core element of high magnetic permeability material, means for operatively connecting the plate to the movable core element, a stationary core element of high magnetic permeability material, a plurality of coils operatively associated with the core elements, means for providing AC current to at least one of the coils, a voltage detector for detecting changes in voltage due to variations in the magnetic flux in the core elements, and an indicator operatively connected to the detector.

The invention also contemplates a method of detecting the level of solids in a generally vertical axis vessel utilizing a movable core element of high magnetic permeability material that is pivotal with respect to a stationary core element of high magnetic permeability material to increase or decrease the gap between portions thereof, and a magnetic flux detector for detecting the changes in the magnetic flux due to movement of the movable element with respect to the stationary element. The method comprises the steps of: (a) Causing the solids to move generally downwardly within the vessel. (b) Disposing a physical element in the vessel at a given level to engage any solids in the vessel at that given level. (c) Transforming movement of the physical element in response to the presence or absence of solids in the vessel at that given level to pivotal movement of the movable core element with respect to the stationary core element. And, (d) sensing and indicating the change in magnetic flux in the core elements as a result of the pivotal movement of the movable element with respect to the stationary element. Step (b) is preferably practiced by disposing a flat plate perpendicular to the vessel axis, and the vessel, and step (c) is preferably practiced by mounting the plate to a shaft mounted for torsional movement.

It is the primary object of the present invention to provide a reliable solids level detector or the like that is simple and easy to utilize, repair, and replace. This and other objects of the invention will become clear from an inspection of the detailed description of the invention and from the appended claims.

DETAILED DESCRIPTION OF THE DRAWINGS

Figure 1:
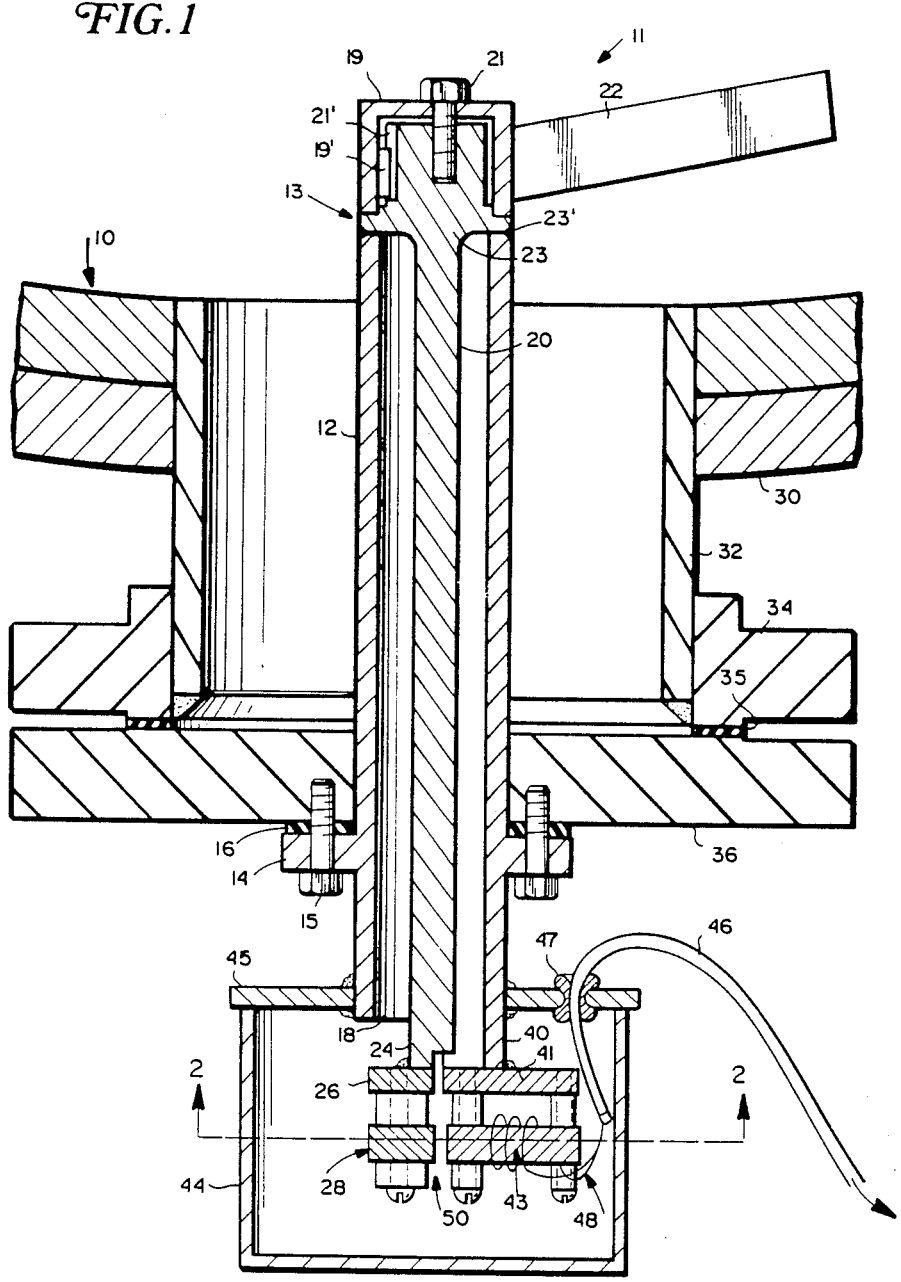
FIG. 1 is a detail view, partly in cross section and partly in elevation, of an exemplary solids level indicator according to the invention, mounted in the wall of a vessel.

An exemplary solids level detecting assembly 11 according to the present invention is shown in FIG. 1 in association with a wall of a continuous paper pulp digester, or the like. A plurality of the assemblies 11, will be associated with a digester or other type of vessel as illustrated in FIG. 1 of U.S. Pat. No. 3,971,254, the disclosure of which is hereby incorporated by reference herein.

The assembly 11 according to the present invention preferably comprises a first hollow shaft 12 having a shaft axis passing through the center thereof. The first shaft 12 is operatively affixed at a first portion—namely collar 14 thereof—to the vessel, and has a first end 13 remote from the first portion (collar) 14 and extending into the vessel. Preferably a plurality of bolts 15 pass through the collar 14 and operatively connect it to the vessel and a gasket 16 may be provided for sealing the assembly at that point. The shaft 12 also has a second, open end 18 opposite the end 13.

The sensing assembly 11 also comprises a second shaft 20. The first end 23 of shaft 20 is rigidly connected (e.g. by weld 23') to the first end 13 of shaft 12. This connection also seals off the interior of shaft 13 from the digester pressure. A bolt 21 or the like connects a connector (cup shaped sleeve) 19 to the shaft 20, and a plate or paddle 22 —which preferably is flat and extends perpendicular to the axis of the vessel so as to be acted upon by solid particles—is rigidly connected to connector 19, and thus operatively rigidly connected to both the shafts 12 and 20 at the first end 23 of the shaft 20, and first end 13 of the shaft 12. A key 19' in a keyway 21', or the like, prevents the connector 19 from rotating relative to shaft end 23. Thus the paddle 22 and connector 19 can be removed before the apparatus is to be disassembled, and after loosening bolts 15 the shaft 12 can then be pulled out through the central opening in a mounting flange (outer flange 36).

The second end 24 of the shaft 20, opposite the first end, is a free end, being connected to a mounting plate 26, which in turn is connected to a movable core element 28 of high magnetic permeability material (e.g. iron).

In order to facilitate mounting of the sensing means, a mounting plate 30—which has basically the same curvature as the digester wall or the like—is connected to the outside of the digester wall, and to a pipe 32. The pipe 32 is welded or otherwise attached to a flange 34 at the most exterior end thereof, and a gasket 35 is provided between the mounting flange 34 and an outer flange 36. The outer flange 36 is what the bolts 15 are directly connected to. Other bolts, and nuts, not shown, are provided connecting the flanges 34, 36 together.

The movable core element 28 comprises part of a differential transformer. An extension 40 of the first shaft 12 is preferably connected through a mounting plate 41 to a stationary core element 43, of high magnetic permeability material (e.g. iron) of the differential transformer. The differential transformer is protected by a housing which preferably comprises a mounting plate 45 which is welded or otherwise rigidly attached to the second end 18 of the shaft 12, and has a removable cover 44 associated therewith. A cable 46 extends through a grommet 47 in the mounting plate 45 and is connected to wires 48 associated with the differential transformer, the wires leading to an amplifier, indicator, and other electrical components of the device 11.

Figure 2:
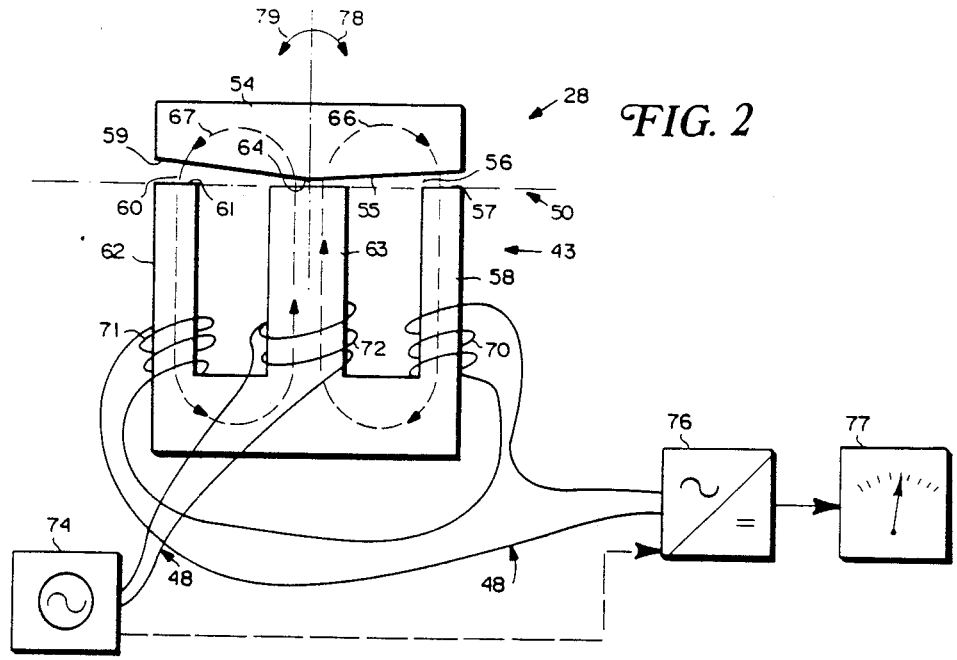
FIG. 2 is a diagrammatic detail view of a first embodiment of a differential transformer sensing mechanism and related apparatus utilized with the indicator of FIG. 1, and viewed along lines 2—2 of FIG. 1.

According to the invention, one embodiment that the differential transformer can take is illustrated in FIG. 2. It will be seen in this embodiment that a gap 50 is provided between the movable core element 28 and the stationary core element 43. The movable core element comprises a generally parallelepiped body 54, except that it has a tapered portion 55 which defines with a flat portion 57 of a pole piece 58 of the stationary element 43, a first gap 56. Also it has a second tapered portion 59 which defines with a flat portion 61 of a second pole piece 62 of the stationary core element 43 a second gap 60. The stationary element 43 also comprises a central core element 63, and the tapered surfaces 55, 59 meet in an apex 64 about which the movable element body 54 is pivotal. It is not necessary that the apex 64 actually touch the central pole piece 63; it is merely necessary that the axis of the shaft 20 pass through the pivot point so that the distance between the movable and stationary elements is constant and the balance between the magnetic fluxes will not be disturbed. It will be seen that the magnetic field in the differential transformer is distributed along two main flux paths 66, 67, the first flux path 66 being defined through first gap 56, and the second flux path 67 passing through second gap 60.

The sensing assembly also comprises a plurality of coils, such as end coils 70, 71 and central coil 72. AC current, such as from signal generator 74, is supplied to at least one of the coils—preferably to the center coil 72. As illustrated in FIG. 2, the coil 70 is wrapped around the first pole piece 58, the coil 71 is wrapped around the second pole piece 62, and the coil 72 is wrapped around the center pole piece 63. Preferably the current from signal generator 74 is supplied only to the center coil 72, and generates the magnetic field defined by the magnetic flux paths 66, 67.

The sensing means also comprises the voltage detector 76 and the indicator 77. The detector 76 is phase locked to the signal generator 74 so that it yields a positive signal if the movable core element body 54 pivots in direction 78 (decreasing first gap 56 and increasing the second gap 60), and a negative signal if it pivots in direction 79 (decreasing second gap 60 and increasing first gap 56). The angle of resolution may readily be $10^{-5}$ radians, or better. The increased voltage amplitude detected by the detector 76 is displayed on a conventional indicator 77. The "indicating" function also—or alternatively—can be provided as an input to a control system that controls the level of solids in the vessel (e.g. feed of chips to digester).

Note that the components 74, 76 and 77 are connected by the wires 48 to the coils 70-72, so that all of such elements 74, 76, and 77 may be mounted entirely exteriorly of the housing defined by the elements 44, 45. The coils 70 and 71, cooperating with voltage detector 76, comprise a flux detector.

Operation

Utilizing the apparatus of FIGS. 1 and 2 it is possible to determine the level of solids in a generally vertical axis vessel (such as a digester). As the solids (e.g. wood chips) move downwardly within the vessel 10 they engage the physical element (e.g. plate 22) disposed in the vessel 10 at a given level. The solids acting on the plate 22, through key 19' and weld 23', effect torsional movement of the first shaft 12 and the second shaft 20. The second shaft 20 is rotated about an axis extending through the apex 64, between the movable core element 28 and stationary core element 43. This rotational or pivotal movement, for example in the direction of arrow 78, causes a decreases in the gap 56 and an increase in the gap 60. This changes the magnetic flux in the paths 66, 67, which are established by current supplied to the central coil 72 by the signal generator 74. This change in magnetic flux is sensed as a change in voltage amplitude at voltage detector 76, by the coils 70, 71, and the detector 76, and is displayed on indicator 77 and/or used to adjust the level of solids within the digester. When no solids act on the paddle 22, the movable element 28 will pivot in the direction of arrow 79, and will ultimately be indicated as a lack of solids at the level of the vessel 10 at which the paddle 22 is disposed.

As can be seen the shafts 12 and 20 may be made quite substantial, and are connected only by the bolts 15 to the vessel, allowing ready removal and replacement. Also, the elements 28, 43, etc. disposed within the housing defined by the elements 44, 45 can withstand high temperatures (e.g. up to 180° C.), and thus there is no necessity for cooling water. Also no shear pins or the like are provided.

Figure 3:
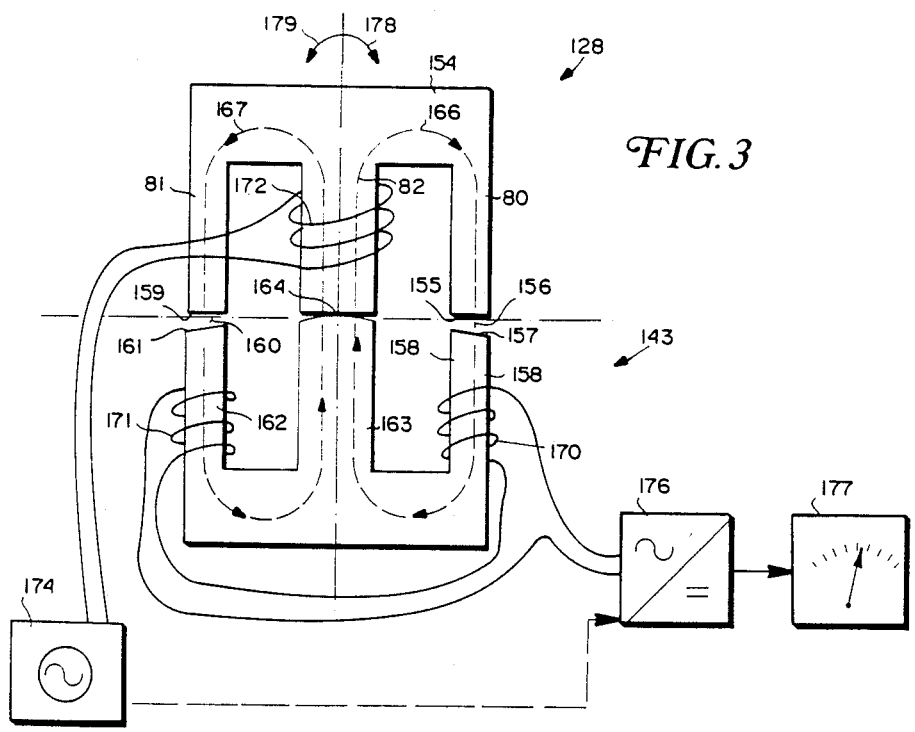
FIG. 3 is a diagrammatic detail view of a second embodiment of differential transformer that may be utilized according to the invention.

The FIG. 3 Embodiment

Another embodiment of the sensing components is illustrated in FIG. 3. In this embodiment, components functionally equivalent to those in the FIG. 2 embodiment are illustrated by the same reference numeral only preceded by a "1". Note that in this embodiment the movable core element body 158 has two end pole pieces 80, 81 and a central pole piece 82. The surfaces 157, 161 of the pole pieces 158, 162 of the stationary element 143 are illustrated as tapered rather than the surfaces 155, 159 of the movable element pole pieces 80, 81, but it does not matter which elements are tapered. Again the apex 164 need not be at a point where the movable and stationary core elements 128, 143 actually touch, just so it is at the axis of rotation of the second shaft 20.

The middle coil 172 is illustrated as wrapped around the movable element central pole piece 82 rather than the stationary element central pole piece 163, however it does not matter which element is stationary and which is movable. Operation of this embodiment is essentially identical, however, current being supplied by signal generator 174 establishing magnetic flux paths 166, 167, with pivotal movement of the movable body 154 in direction 178 causing the first gap 156 to decrease while the second gap 160 increases. This is sensed by the coils 170, 171, and the voltage detector 176, and is displayed on indicator 177. Of course a number of other modifications of the sensor elements are also possible.

It will thus be seen that according to the present invention a solids level detector, and a method of detecting the level of solids in a digester or the like, have been provided. The invention is simple and easy to install, repair, replace, and operate, yet is very sensitive in detecting the solids level. While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A detector for detecting the solids position in a vessel—which vessel has an axis—adapted to have solid particles moving therein generally along said axis, comprising:
    a first hollow shaft having a shaft axis passing through the center thereof;
    a second shaft, generally concentric with said first shaft, and extending along said shaft axis and having first and second
    means for operatively fixing said first shaft at a first portion thereof to said vessel, with a first end remote from said first portion and extending into said vessel;
    means for operatively connecting said second shaft first end to said first end of said first shaft, said second end of said second shaft being free;
    a plate operatively connected to said first shaft first end and said second shaft first end, and extending as a cantilever therefrom, so that it is generally perpendicular to the axis of said vessel, and
    sensing means, including a first sensor element mounted to and movable with said second shaft second end, and a stationary sensor element mounted to said first shaft and adjacent said first sensor element, for sensing twisting motion of said first shaft as a result of solid paticles acting on said cantilevered plate.

2. A detector as recited in claim 1 wherein said sensing means stationary sensor element is held stationary by connection thereof to a second end of said first shaft, which extends outwardly from said vessel.

3. A detector as recited in claim 2 further comprising a housing for said sensing means, said housing held stationary, and in place, exteriorly of said vessel by said second end of said first shaft.

4. A detector as recited in claim 3 wherein said sensing means first sensor element comprises a movable core element made of high magnetic permeability material, and said sensing means stationary sensor element comprises a stationary core element of high magnetic permeability material; and wherein said sensing means further comprises a plurality of coils disposed around said core elements, means for providing alternating current to at least one of said coils, a voltage detecting means for detecting differences in voltage between remaining coils, and a voltage indicator means operatively connected to said voltage detecting means.

5. A solids level detecting assembly comprising:

a vessel adapted to have solid particles moving downwardly therein, and having a generally vertical axis;

means for detecting to the level of solid paticles in said vessel, including (a) a plate; (b) a movable core element of high magnetic permeability material; (c) means for operatively connecting said plate to said movable core element so that said plate is cantilevered; (d) a stationary core element of high magnetic permeability material; (e) a plurality of coils operatively associated with said core elements; (f) means for providing alternating current to at least one of said coils; (g) a voltage detecting means for detecting the difference in coil voltage between remaining coils due to variations in magnetic flux in said core elements; and (h) a voltage indicating means operatively connected to said voltage detecting means; and means for mounting said level detecting means in said vessel so that said cantilevered plate is within said vessel and is disposed generally horizontally.

6. An assembly as recited in claim 5 wherein the structures (b) and (d)-(h) are all mounted completely exteriorly of said vessel, and are readily accessible from the exterior of the vessel.

7. An assembly as recited in claim 5 wherein said means for operatively connecting said plate to said movable core element comprises a first shaft defining an axis of rotation, and wherein said axis of rotation passes through a pivot point for pivotal movement of said movable core element with respect to said stationary core element.

8. An assembly as recited in claim 7 wherein said means for mounting said level detecting means comprises a hollow shaft, said first shaft being generally concentric with said hollow shaft and disposed therewithin, and having first and second ends; and further comprising means for operatively affixing said hollow shaft at a first portion thereof to said vessel with a first end remote from said first portion and extending into said vessel, and means for operatively connecting said hollow shaft first end to said firs end of said first shaft, said second end of said first shaft being free and connected to said movable core element.

9. An assembly as recited in claim 7 wherein said plate is flat and wherein said axis of rotation of said shaft is disposed in the flat plane of said plate.

10. A method of detecting the level of solids in a generally vertical axis vessel utilizing a movable core element of high magnetic permeability material that is pivotal with respect to a stationary core element of high magnetic permeability material to increase or decrease the gap between portions thereof, and a flux detector for detecting the changes in magnetic flux in the core elements in response to pivotal movement of the movable element with respect to the stationary element, comprising the steps of:

(a) causing the solids to move generally downwardly within the vessel;

(b) disposing a cantilevered flat plate in the vessel at a given level to engage any solids in the vessel at that given level;

(c) mounting the cantilevered plate to a shaft for transforming movement of the cantilevered plate in response to the presence of solids in the vessel at that given level to torsional movement of the shaft and pivotal movement of the movable core element with respect to the stationary core element; and (d) sensing and indicating the change in magnetic flux in the core elements as a result of the pivotal movement of the movable element with respect to the stationary element.

11. A detector for detecting the solids position in a vessel—which vessel has an axis—adapted to have solid particles moving therein generally along said axis, comprising:

a first hollow shaft having a shaft axis passing through the center thereof;

a second shaft, generally concentric with said first shaft, and extending along said shaft axis and having first and second ends;

means for operatively fixing said first shaft at a first portion thereof to said vessel, with a first end remote from said first portion and extending into said vessel;

means for operatively connecting said second shaft first end to said first end of said first shaft, said second end of said second shaft being free;

a plate operatively connected to said first shaft first end and said second shaft first end, so that it is generally perpendicular to the axis of said vessel; and sensing means, including a first element mounted to and movable with said second shaft second end, and a stationary element adjacent said first element, for sensing twisting motion of said first shaft as a result of solid particles acting on said plate;

said sensing means first element comprising a movable core element made of high magnetic permeability material, and said sensing means stationary element comprising a stationary core element of high magnetic permeability material; and said sensing means further comprising a plurality of coils disposed around said core elements, and means for providing alternating current to at least one of said coils, a voltage detecting for means detecting differences in voltage between remaining coils, and a voltage indicating means operatively connected to said voltage detecting means; and wherein three coils are provided, a central coil which is connected to said source of AC current, and two end coils which are operatively connected to pole pieces of said stationary core element of said sensing means; said two end coils and said voltage indicating means comprising a flux detector.

12. A detector as recited in claim 11 wherein said sensing means stationary and movable core elements are formed and mounted so that upon relative movement between said stationary and movable core elements 2 gap between the movable element and one pole piece of said stationary element increases while 2 gap between the movable element and the other pole piece of said stationary element decreases.

13. A detector as recited in claim 12 wherein said movable core element has substantially the shape of a parallelepiped except that it has first and second faces angled with respect to said stationary element which meet at a central apex, which apex engages said stationary element, said movable core element being pivotal about said apex.

14. A detector as recited in claim 12 wherein said movable core element has three pole pieces, a central pole piece and two end pole pieces, and said stationary core element has three pole pieces, a stationary pole piece and two end pole pieces; said end coils being wrapped around said end pole pieces of said stationary core element, and said central coil operatively disposed around said movable element central pole piece; and wherein said pole pieces of said stationary element are tapered to a central apex which engages the central pole piece of said movable element, said movable element being pivotal about said apex.

15. A solids level detecting assembly comprising:
a vessel adapted to have solid particles moving downwardly therein, and having a generally vertical axis;
means for detecting the level of solid particles in said vessel, including (a) a plate; (b) a movable core element of high magnetic permeability material; (c) means for operatively connecting said plate to said movable core element; (d) a stationary core element of high magnetic permeability material, having pole pieces; (e) three coils operatively associated with said core elements, a central coil which is connected to source of AC current, and two end coils which are operatively connected to pole pieces of said stationary core element of said sensing means; (f) a voltage detecting means for detecting difference in voltage between said end coils due to variations in magnetic flux in said core elements; and (g) a voltage indicating means operatively connected to said voltage detecting means; said voltage indicating means and two end coils comprising a flux detector; and
means for mounting said level detecting means in said vessel so that said plate is within said vessel and is disposed generally horizontally.

16. An assembly as recited in claim 15 wherein said sensing means stationary and movable core elements are formed and mounted so that upon relative movement between said stationary and movable core elements 2 gap between the movable element and one pole piece of said stationary element increases while 2 gap between the movable element and the other pole piece of said stationary element decreases.

17. An assembly as recited in claim 16 wherein said movable core element has substantially the shape of a parallelepiped except that it has first and second faces angled with respect to said stationary element which meet at a central apex, which apex engages said stationary element, said movable core element being pivotal about said apex.

18. An assembly as recited in claim 16 wherein said movable core element has three pole pieces, a central pole piece and two end pole pieces, and said stationary core element has three pole pieces, a stationary pole piece and two end pole pieces; said end coils being wrapped around said end pole pieces of said stationary core element, and said central coil operatively disposed around said movable element central pole piece; and wherein said pole pieces of said stationary element are tapered to a central apex which engages the central pole piece of said movable element, said movable element being pivotal about said apex.

* * * * *